United States Patent
Neubarth et al.

(10) Patent No.: US 7,889,477 B2
(45) Date of Patent: Feb. 15, 2011

(54) HIGH VOLTAGE POWER SUPPLY FOR STATIC NEUTRALIZERS

(75) Inventors: Stuart Neubarth, Mountain View, CA (US); Michael A. Lehr, Mountain View, CA (US); Scott Gehlke, Berkeley, CA (US); Peter Gefter, South San Francisco, CA (US)

(73) Assignee: Illinois Tool Works Inc., Glenview, IL (US)

( * ) Notice: Subject to any disclaimer, the term of this patent is extended or adjusted under 35 U.S.C. 154(b) by 566 days.

(21) Appl. No.: 11/767,295

(22) Filed: Jun. 22, 2007

(65) Prior Publication Data

US 2008/0316773 A1    Dec. 25, 2008

(51) Int. Cl.
*H01T 23/00* (2006.01)
(52) U.S. Cl. .................................... 361/212
(58) Field of Classification Search ............ 363/17, 363/21.01, 22, 230, 21.02; 323/318; 315/308; 361/230
See application file for complete search history.

(56) References Cited

U.S. PATENT DOCUMENTS

| | | | |
|---|---|---|---|
| 7,034,471 B2 * | 4/2006 | Kimura et al. ............ 315/308 |
| 7,057,130 B2 | 6/2006 | Gefter et al. | |
| 7,498,751 B2 * | 3/2009 | Bai et al. ................. 315/247 |
| 2002/0149890 A1 * | 10/2002 | Kaneko et al. ............. 361/18 |
| 2006/0164023 A1 * | 7/2006 | Siessegger ............... 315/274 |
| 2006/0209575 A1 * | 9/2006 | Archer ..................... 363/22 |
| 2007/0133232 A1 * | 6/2007 | Sigamani ................. 363/16 |
| 2007/0279829 A1 * | 12/2007 | Gefter et al. .............. 361/213 |
| 2008/0144339 A1 * | 6/2008 | Hsieh et al. ............. 363/21.02 |
| 2008/0239760 A1 * | 10/2008 | Telefus et al. ........... 363/21.01 |
| 2008/0309310 A1 * | 12/2008 | Gorczyca et al. ........... 323/318 |
| 2008/0316773 A1 * | 12/2008 | Neubarth et al. ............ 363/17 |

* cited by examiner

*Primary Examiner*—Adolf Berhane
*Assistant Examiner*—Yemane Mehari
(74) *Attorney, Agent, or Firm*—Stephen R. Uriarte (57) ABSTRACT

A high voltage power supply for a static neutralizer is disclosed. The high voltage power supply includes a resonant converter and a load with an emitter module having an emitter, reference electrode, and a capacitance value. The resonant converter is disposed to have a resonant frequency and an output coupled to the load. The resonant converter generates an output waveform with an amplitude sufficient for generating to ions by corona discharge when the load receives the output waveform. The load is predominantly capacitive when the resonant converter is operating at the resonant frequency.

39 Claims, 7 Drawing Sheets

*Prior Art*

HIGH VOLTAGE POWER SUPPLY FOR STATIC NEUTRALIZERS

BACKGROUND

(1) Technical Field

The present invention relates to high voltage power supplies for static neutralizers. More particularly, the present invention relates to high voltage power supplies that employ a resonant converter having a highly efficient circuit design. This resonant converter is suitable for driving loads with relatively high capacitance, such as emitters used in static neutralizers for generating bipolar ions by corona discharge, for enabling a compact, small foot-print implementation of these power supplies, or both.

(2) Background Art

Static neutralizers are commonly employed by the electronics industry to reduce or eliminate electro-static charge from static-sensitive components or equivalent charged objects. Static neutralizers are designed to eliminate or minimize static charge from these charged objects by generating bipolar air or, in some instances gas ions, and delivering these air or gas ions to the charged object. Static neutralizers employ a set of emitters, sometimes referred to as ionizing electrodes, corona electrodes, or corona filaments or wires. Each emitter is disposed to have a shape suitable for generating ions by corona discharge. A common emitter shape includes a long thin cylindrical shape, such as a thin wire or filament, or an end portion having a small tip radius or a sharp point. These emitters are sometimes housed in an emitter module or cell that may include one or more conducting surfaces coupled to a reference potential, such as earth ground or circuit ground. These conducting surfaces are commonly referred to collectively as a "reference electrode."

Generating ions by corona discharge requires applying a relatively high electrical potential to at least one emitter in order to create large voltage gradients at points of high curvature on the emitter surface. When a sufficiently large voltage gradient exists on its surface, a positively charged electrode produces a cloud of positive ions by collecting electrons from nearby air molecules. Similarly, a negatively charged electrode produces a cloud of negative ions by transferring electrons onto nearby air molecules. Collectively, these positively and negatively charged ions are sometimes referred to as a bipolar ion cloud and are considered useful for static neutralization since the bipolar ion cloud contains a group of ions that have a mix of polarities that will maximize charge neutralization for a charged object selected for neutralization. The proportion of negative and positively charged ions may change depending on the environment conditions in which the static neutralizer is used.

To create a mix of ions having positive and negative charges, these static neutralizers may use an alternating high voltage waveform. Because opposite electrical charges attract, negatively charged ions are drawn to positively charged surfaces while positively charged ions are drawn to negatively charged surfaces. Once these ions reach a charged surface, the ions compensate for an excess of positive or negative charges on the surface, diminishing and thereby "neutralizing" static charge on the surface and reducing the associated hazards with these static charges.

These emitters, emitter modules or both exhibit an impedance characteristic that includes a relatively high capacitance which often exceeds 100 pF, requiring a high voltage power supply capable of driving the waveform at a frequency and amplitude suitable for creating ions by corona discharge. Since the corona voltage or waveform amplitude required to create ions by corona discharge is high, this power supply must have sufficient voltage and current driving capacity, which usually requires a large and bulky transformer. Besides the expense associated with using a large transformer, the bulk of the transformer limits placement versatility of the emitter(s), emitter module or both.

A class of circuits known variously as resonant converters or resonant inverters is commonly used to generate high voltage sine waves from low voltage DC inputs. This class of circuits is frequently used in electronic ballasts that excite Cold Cathode Fluorescent Lights and Compact Fluorescent Lights, which may respectively be referred to as "CCFL" and "CFL". One of these topologies is the push-pull version of the current fed Class-D parallel resonant converter, sometimes called the Baxandall oscillator. An example of this architecture is shown in FIG. 1.

Figure 1:
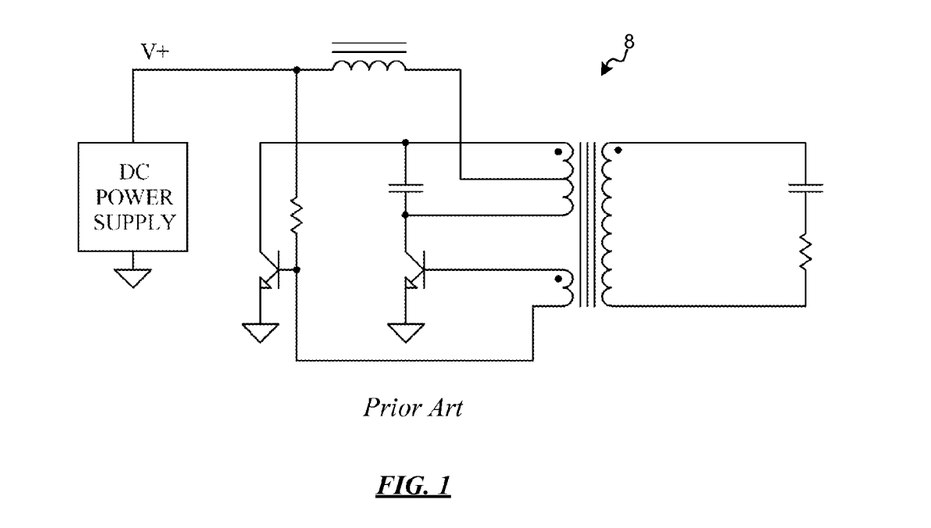
FIG. 1 illustrates a Class D parallel resonant converter circuit.

Using a resonant converter 8 of the type disclosed in FIG. 1 to avoid the use of a large and bulky transformer in a high voltage power supply that is suitable for use in a static neutralizer would not be obvious to try for many reasons. Resonant converters currently used in electronic ballasts that excite CCFLs normally only provide a strike voltage of approximately 2500 volts peak for a fraction of a second and then produce a sinusoidal waveform with peak amplitude that is typically less than 1000 volts during continuous operation after ignition. The amplitude of the exciting waveform typically used to create ions by corona discharge, in contrast, is higher, typically in the range of 3500 volts peak to 7500 volts peak. In addition, the capacitive load of a CCFL tube before striking is typically only around 10 pF while the capacitive load presented by an ionizer is often higher and may exceed 100 pF in some instances. The high frequency power supply driving the emitters in a static neutralizer frequently operate continuously for relatively long periods of time, while generating much higher output voltages and output currents than required of the power supplies that drive CCFLs. These factors generally make the power supplies for high frequency static neutralizers much larger, more expensive, and more difficult to design than the power supplies that drive CCFLs. Furthermore, the need to produce high frequency, high voltage waveforms in a confined space leads to a host of problems with conventional resonant converter designs as a result of spurious oscillation modes that arise from parasitic circuit elements, as well as problems concerning the reduced efficiency of compact designs and related problems associated with reliability and thermal management.

Consequently, there is a need for a new type of a high voltage power supply that is efficient yet capable of driving a high frequency, high voltage waveform onto at least one emitter so that ions are created by corona discharge. Moreover, there is a need for a high voltage power supply this not only efficient but is also low cost and suitable for compact, small foot print implementations.

SUMMARY

A high voltage power supply for a static neutralizer is disclosed. The high voltage power supply includes a resonant converter and a load with an emitter module having an emitter, reference electrode and a capacitance value. The resonant converter is disposed to have a resonant frequency and an output coupled to the load. The resonant converter generates an output waveform with an amplitude sufficient for generating ions by corona discharge when the load receives the output waveform. The load is predominantly capacitive when the resonant converter is operating at the resonant frequency.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

Figure 2:
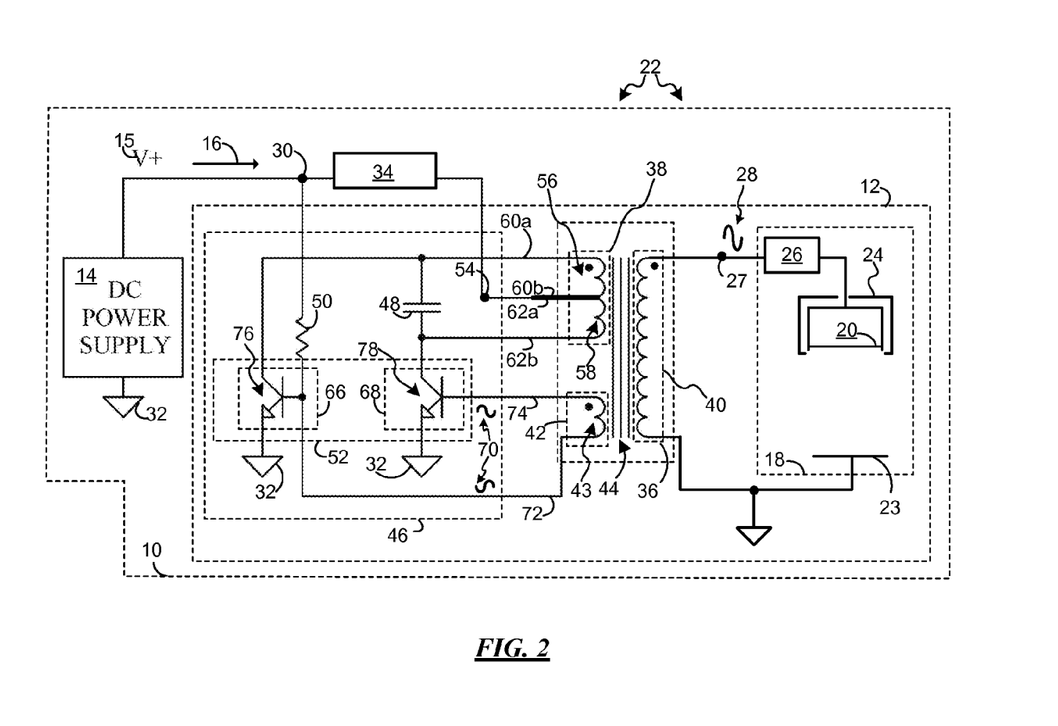
FIG. 2 illustrates a high voltage power supply that uses a resonant converter in accordance with one embodiment of the present invention.

Referring now to FIG. 2, a high voltage power supply 10 that includes a resonant converter 12, and a DC power supply 14 that provides excitation energy, which may be in the form of a low voltage 15 and a current 16, to resonant converter 12. Resonant converter 12 includes and is configured to resonate with a load 18 that includes at least one emitter 20, which renders power supply 10 suitable for use with a static neutralizer 22. Static neutralizer 22 may include a reference electrode 23 and an emitter module 24 that may be used to house emitter 20. Load 18 is predominantly capacitive at the resonant frequency of resonant converter 12, exhibiting a quality factor or "Q factor" that may typically be in an approximate range from 2 to 1000 at this frequency, depending on the dielectric properties of the insulating materials used to construct emitter 20 and emitter module 24 and also on the level of corona discharge produced by emitter 20 during operation. In the example shown in FIG. 2, load 18 not only includes emitter 20 and emitter module 24 but also is modified to further include an ion balance circuit 26.

During operation of static neutralizer 22, emitter 20 receives a high voltage waveform, named "output waveform", 28 from a transformer output or "waveform output" 27 of transformer 36. Output waveform 28 is approximately sinusoidal and has an amplitude, a frequency and an oscillation period. Output waveform 28 may be in any form suitable for generating a set of ions by corona discharge when output waveform 28 is applied to emitter 20. The frequency may range approximately from 2 kHz to 100 kHz and is not intended to be limiting in any way but may be determined as required to effect static charge neutralization from a charged object (not shown) selected for neutralization, named the "target object". The set of ions generated includes ions of both polarities, sometimes referred to as a "bipolar ion cloud".

Ion balance circuit 26, such as a capacitor (not shown) having a value that is typically several times larger than the capacitance exhibited by emitter 20, may be provided as part of static neutralizer 22. Ion balance circuit 26 provides a DC offset to output waveform 28 so that an approximate balance of positive and negative ions, named "ion balance", reach the surface of the target object. Since ion balance will vary according to environmental conditions encountered by and the physical implementation of static neutralizer 22, the value of this capacitor is not intended to limit the embodiment shown in any way.

Resonant converter 12, which may also be referred to as a "power inverter" or "inverter", generates output waveform 28 in response to receiving excitation energy from a suitable power source, such as DC power supply 14. DC power supply 14 may be a voltage source or a current source power supply circuit, depending on the requirements of the application and thus, the implementation of DC power supply 14 is not intended to limit the present invention in any way. DC power supply 14 is coupled to ground 32, and includes an output 30 that may be coupled to resonant converter 12 through an isolation circuit 34. Isolation circuit 34 permits excitation energy, which may be in the form of low voltage 15 and current 16, to flow from DC power supply 14 to a transformer 36, and limits DC power supply 14 from acting as another load on resonant converter 12 by reducing the flow of high frequency current between transformer 36 and DC power supply 14 during operation. Low voltage 15 has a value in an approximate range from 5 to 100 Volts, while current 16 has a value in an approximate range from 0.1 to 3 Amps. These values are not intended to be limiting in any way. The term "ground" is not intended to be limited to earth ground but may be a reference potential used by resonant converter 12 as its signal ground.

Besides transformer 36, resonant converter 12 may further include a commutation circuit 46 and a sensing circuit 42, while transformer 36 includes a primary winding 38, secondary winding 40 and core 44. Commutation circuit 46 includes a capacitor 48, a bias resistor 50 and a switching circuit 52. Sensing circuit 42 may be implemented by using a feedback winding 43 on the same core used by secondary winding 40 in transformer 36, such as core 44.

Primary winding 38 includes a center tap 54 and legs 56 and 58. Legs 56 and 58 each have a pair of ends, such as ends 60a and 60b and ends 62a and 62b, respectively. To obtain closely matched characteristics, legs 56 and 58 may be wound together, typically using either bifilar wire or closely placed parallel strands. Ends 60b and 62a form center tap 54, which is disposed to receive a current from output 30 through isolation circuit 34.

In the example shown, isolation circuit 34 may be implemented by using an AC choke coil (not shown) that has a value approximately within an approximate range from 50 to 1000 µH. Using an AC choke coil having a value within this range is not intended to limit the example shown in any way, and other values may be used as long as the value selected enables the AC choke coil to isolate resonant converter 12 from DC power supply 14 and allows a current from output 30 to reach primary winding 38 via center tap 54. Using isolation circuit 34 renders resonant converter 12 as a "current-fed" circuit since isolation circuit 34 forces a current into primary winding 38. Transformer 36 may be of the bobbin-wound design variety although this implementation detail is not intended to be limiting in any way.

Switching circuit 52 may be implemented using a pair of electronic switching elements, named "switch elements", 66 and 68. In the example shown, switch elements 66 and 68 are implemented in the form of bipolar NPN transistors 76 and 78, respectively. The use of bipolar NPN transistors is not intended to be limiting in any way, and one of ordinary skill in the art having the benefit of the herein disclosure would readily recognize that any suitable switch element may be employed, such as a MOSFET, JFET, IGBT, MCT, thyristor, opto-isolator or equivalent switch element.

Ends 60a and 62b respectively connect to the collectors of bipolar NPN transistors 76 and 78, while the emitter terminals of transistors 76 and 78 connect to ground 32. Ends 72 and 74 of feedback winding 43 connect to the base terminals of transistors 76 and 78, respectively.

Secondary winding 40 is coupled magnetically to feedback winding 43 and primary winding 38 through core 44. Core 44 may be implemented using a low-loss ferrite material, powdered iron material or any equivalent material that will permit transformer 36 to couple magnetically feedback winding 42 with secondary winding 40. Secondary winding 40 is coupled to emitter 20, which is disposed to have a high Q factor at the resonant frequency of resonant converter 12. Secondary winding 40 contains a large number of turns relative to primary winding 40 to provide the step up ratio needed to convert a voltage provided by DC power supply 14 at output 30 into a high voltage sinusoidal waveform across secondary winding 40 during operation of resonant converter 12. Capacitor 48 connects across to ends 60a and 62b, which provides a shaping function and ensures zero voltage switching of transistors 76 and 78. The placement of capacitor 48 within commutation circuit 46 permits capacitor 48 to also minimize voltage spikes during commutation of transistors 76 and 78 that result from leakage inductance in series with legs 56 and 58. In an alternative embodiment of the example shown in FIG. 2, capacitor 48 may be omitted if the shaping function, zero voltage switching, minimization of voltage spikes or any of combination of these features is not required.

The total reactance of elements that is reflected either to primary winding 38 or to secondary winding 40 define, for resonant converter 12, an equivalent resonant tank circuit that has a resonant frequency based on the total reactance of these elements. Resonant converter 12 maintains an oscillation at this resonant frequency. These elements include the magnetizing inductance of transformer 36, the leakage inductance of primary winding 38 and secondary winding 40, the inter-winding, intra-winding, and winding-to-core parasitic capacitance in primary winding 38 and secondary winding 40, the capacitance of capacitor 48, and the total capacitance of load 18.

In the example in FIG. 2, the capacitance of load 18 includes the capacitance of emitter 20, emitter module 24 or both, depending on the design of emitter 20 and emitter module 24. The capacitance of load 18 may also include additional elements, such as those in ion balance circuit 26, that are part of the load seen by secondary winding 40 and thereby influence the value of the resonant frequency of resonant converter 12. The capacitance of these additional elements plus the capacitance of load 2 are collectively referred to as the "output capacitance" of secondary winding 40.

If an AC choke coil is used to implement isolation circuit 34, the AC choke coil is configured to have high impedance when operating resonant converter 12 at the resonant frequency of its equivalent tank circuit. This configuration isolates the equivalent tank circuit from DC power supply 14 and limits DC power supply 14 from acting as a load on resonant converter 12. Isolating the equivalent tank circuit from DC power supply 14 when operating at the resonant frequency, allows the resonant tank circuit to have a high Q factor, and results in reduced losses in resonant converter 12 and improved purity of the output wave form, such as output waveform 28.

Switching circuit 52 creates and maintains the oscillation in resonant converter 12. In the embodiment shown, switch elements 66 and 68 alternately reverse roles as one switch element turns on while the other switch element turns off. This switching behavior, commonly referred to as "commutation", is caused by the generation of a feedback signal 70 by sensing circuit 42. In the example shown in FIG. 2, feedback signal 70 is in the form of a differential voltage waveform and is transmitted by sensing circuit 42 to the base terminals of bipolar NPN transistors 76 and 78 through ends 72 and 74, respectively. Since in the example shown in FIG. 2, sensing circuit 42 is implemented using feedback winding 43, feedback signal 70 is approximately equal to the oscillating waveform voltage formed across load 18 scaled down by the step down ratio between secondary winding 40 and feedback winding 43. The step down ratio used in the example shown in FIG. 2 may be selected to generate a feedback signal 70 of an amplitude that will effect proper commutation without applying damaging voltages to switch elements 66 and 68. Typically a peak-to-peak voltage of around 4 volts is selected if switch elements 66 and 68 are bipolar NPN transistors. The resulting feedback signal 70 is smaller than but approximately proportional to the oscillating waveform voltage formed across load 18. Using feedback winding 43 to generate feedback signal 70 is not intended to be limiting in any way, but any equivalent sensing circuit may be used that can generate a feedback signal that can be used to trigger the commutation of switch elements 66 and 68.

To create and maintain an oscillation within resonant converter 12, bias resistor 50 supplies sufficient current to the base terminal of either transistor 76 or transistor 78, which causes one of these transistors to turn fully-on, while voltage induced into feedback winding 42 by the oscillation keeps the other transistor turned-off. The fully-on transistor allows current to flow from DC power supply 14 through isolation circuit 34, through either leg 56 or 58 and to ground 32 via the collector and emitter terminals of the transistor that is fully-on.

For example, during a phase within oscillation cycle, bias resistor 50 supplies sufficient current to the base terminal of transistor 76, activating transistor 76. The voltage induced into feedback winding 43 generates feedback signal 70, keeping transistor 78 off. Activated transistor 76 allows current to flow from DC power supply 14 through isolation circuit 34, through leg 56 and to ground via the collector and emitter terminals of transistor 76.

In another example, during another phase within the oscillation cycle, bias resistor 50 supplies sufficient current to the base terminal of transistor 78 through feedback winding 43, activating transistor 78. This oscillation cycle induces a voltage into feedback winding 43, generating feedback signal 70 and keeping transistor 76 off. Activated transistor 78 allows current to flow from DC power supply 14 through isolation circuit 34, through leg 58 and to ground via the collector and emitter terminals of transistor 78.

During each cycle of oscillation, energy is transformed from electrical energy to magnetic energy and back again to electrical energy. The magnetic energy is stored in the magnetic field associated with core 44 of transformer 36, usually principally in one or more gaps in the magnetic circuit of transformer 36. The electrical energy is stored in the capacitive elements of resonant converter 12 including the output capacitance, capacitor 48, and in the various parasitic capacitive elements of transformer 36. When the voltage across load 18 is near zero, most of the energy in resonant converter 12 is stored in the magnetic field associated with core 44 of transformer 36. When the voltage across load 18 is near a positive or negative peak, most of the energy in resonant converter 12 is stored in the capacitive elements of resonant converter 12.

Because core 44 of resonant converter 12 stores essentially all of the energy that it transfers each cycle to the capacitive elements of resonant converter 12, the physical size of core 44 typically increases as the peak output voltage or the output capacitance increases. The size of core 44 must also increase in this case because the winding window of core 44 is typically required to be large enough to accommodate the heavier wire that would be selected for secondary winding 40 in order for secondary winding 40 to carry the larger currents that pass through it as the peak output voltage and the output capacitance increases.

In accordance with an alternative embodiment of the present invention, the embodiment disclosed in FIG. 2 may include integrating high voltage power supply 10 with emitter module 24. The low profile characteristic of high voltage power supply 10 enables this approach novel since power supply 10 not only includes a resonant converter, such as resonant converter 12, that is suitable for providing a waveform that is suitable for generating ions by corona discharge that are effective in static-charge neutralization but also suitable for use as a low-profile solution that can be integrated with the emitter module 24.

Figure 3A:
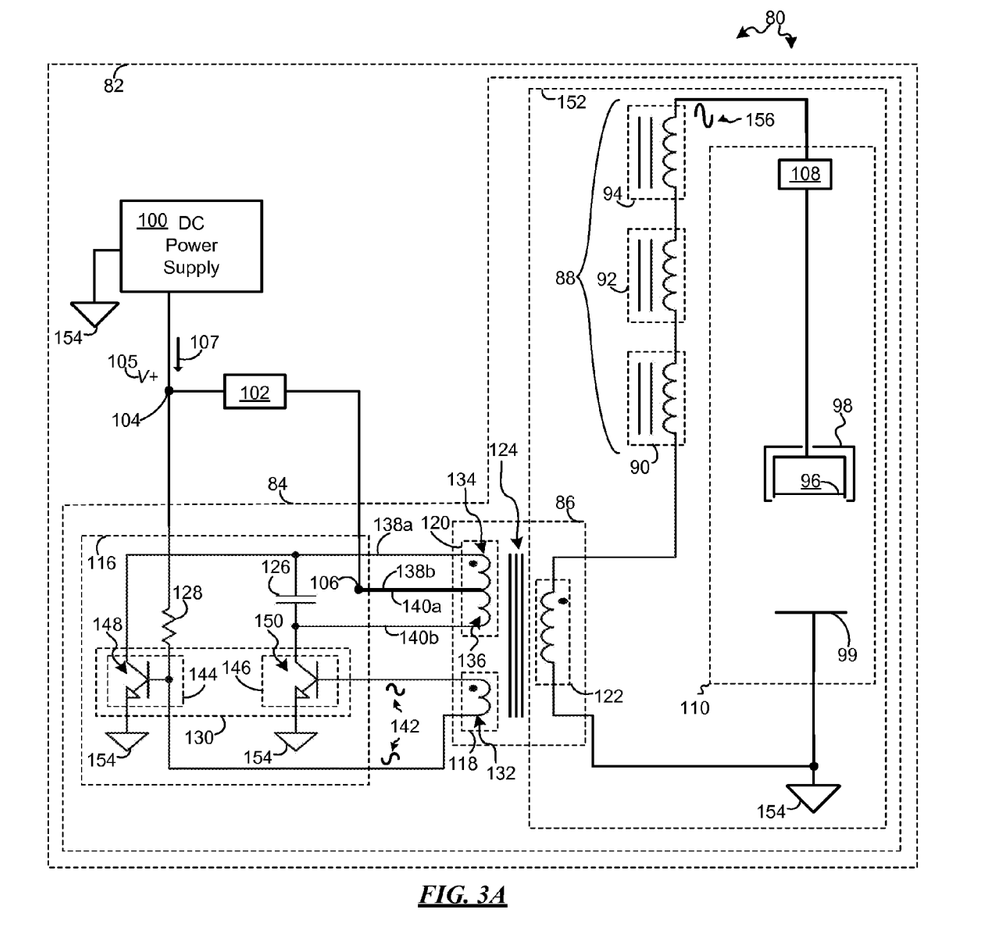
FIG. 3A illustrates a resonant converter that includes an inductance set within a resonant tank circuit in accordance with another embodiment of the present invention.

Turning now to FIG. 3A, a novel resonant converter 84 is disclosed in accordance with yet another embodiment of the present invention. Resonant converter 84 may be used as part of a compact, small foot-print power supply 82, and generates a high voltage output waveform 156 that is suitable for driving a load 110 that is predominantly capacitive and that has a relatively high Q factor, when resonant converter 84 operates at its resonant frequency. For example, load 110 may include at least one emitter 96, rendering power supply 82, resonant converter 84 or both highly suitable for use with a static neutralizer 80. In an alternate implementation, load 110 may further include an ion balancing circuit 108 and an emitter module 98, as shown. Emitter module 98 may include a reference electrode 99. Emitter module 98 may be used to house emitter 96 and may be included as part of static neutralizer 80.

Resonant converter 84 includes a transformer 86 coupled to an inductance set 88 that includes at least one inductive element, such as inductive elements 90, 92 and 94. Voltage stresses and energy storage requirements that would otherwise be carried by transformer 86 are instead distributed across the inductive elements included as part of inductance set 88. This solution reduces loading from parasitic capacitance in the internal circuit components of transformer 86 and reduces electrical stress within these components. Consequently, a power supply, such as power supply 82, that employs resonant converter 84 can be made physically smaller, more efficient, more reliable, easier to optimize, and less expensive to manufacture than conventional designs.

Although FIG. 3A discloses using resonant converter 84 with static neutralizer 80, the novel nature of resonant converter 84 renders it highly suitable for use in other applications that require a compact, efficient, and low cost high voltage waveform generator, such as applications that include providing power for CCFL backlighting in small form factor devices, such as LCD monitors, as well as applications that provide power in compact fluorescent lights. Resonant converter 84 may also be used in power supplies configured for use with air purification systems and other power supplies that provide high voltage AC or DC power.

Figure 3B:
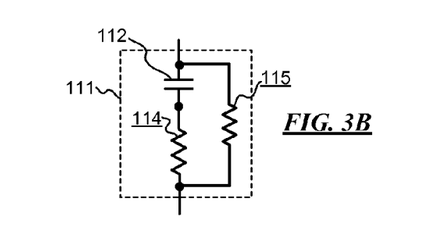
FIG. 3B illustrates a generalized electrical model of an emitter and emitter module that may be used with the resonant converter disclosed in FIG. 3A.

Power supply 82 includes a DC power supply 100 and resonant converter 84, as well as an isolation circuit 102 coupled to an output 104 of DC power supply 100 and a center tap 106 of transformer 86. DC power supply 100 provides excitation energy, which may be in the form of a low voltage 105 and a current 107, to resonant converter 84 through output 104. Emitter 96 and emitter module 98 may be generalized as an electrical load 111 that has a resistance 115 in parallel with a capacitance 112 coupled to a resistance 114 in series, as illustrated in FIG. 3B. Resistance 115 models losses associated with corona discharge from emitter 96, while resistance 114 models conductive and dielectric losses in emitter 96 and emitter module 98. Capacitance 112 models the capacitive load provided by emitter 96 and emitter module 98.

One ordinary of skill in the art after receiving the benefit of the herein disclosure would readily recognize that the circuit design disclosed in FIG. 3A is similar to the circuit design disclosed in FIG. 2 above, except for the inclusion of inductance set 88. DC Power supply 100, isolation circuit 102 and commutation circuit 116 may be implemented to have substantially the same function as DC power supply 14, isolation circuit 34 and commutation circuit 46 that were previously disclosed above with respect to FIG. 2.

Besides transformer 86 and inductance set 88, resonant converter 84 further includes a commutation circuit 116 and a sensing circuit 118, while transformer 86 also includes a primary winding 120, secondary winding 122 and core 124. Commutation circuit 116 includes a capacitor 126, a bias resistor 128 and a switching circuit 130. Sensing circuit 118 is implemented using a feedback winding 132 on the same core used by primary winding 120 and secondary winding 122 in transformer 86, such as core 124. Primary winding 120 includes center tap 106 and legs 134 and 136. Legs 134 and 136 each have a pair of ends, such as ends 138*a* and 138*b* and ends 140*a* and 140*b*, respectively. To obtain closely matched characteristics, legs 134 and 136 may be wound together, typically using either bifilar wire or closely placed parallel strands. Ends 138*b* and 140*a* form center tap 106, which is disposed to receive excitation energy, such as low voltage 105 and current 107, from output 104.

During operation of resonant converter 84, sensing circuit 118 provides a feedback signal 142 to a switching circuit 130, which causes a pair of switch elements 144 and 146, such as bipolar NPN transistors 148 and 150, to switch-on and switch-off in an alternating fashion and which creates and sustains an oscillation in a secondary tank circuit 152. Bias current for transistor 148 flows through bias resistor 128, while bias current for transistor 150 flows through bias resistor 128 and through sensing circuit 118, such as feedback winding 132. Base terminal current through transistor 148 or 150 allows current to flow from DC power supply 100, through isolation circuit 102, through leg 134 or 136 of center-tapped primary winding 120 to ground 154, inducing a magnetic field into core 124. This magnetic field induces voltage into secondary winding 122, causing current to flow in secondary tank circuit 152. In the example shown, secondary tank circuit 152 includes secondary winding 122, inductance set 88 and load 110. The resonant frequency of secondary tank circuit 152 essentially determines the operating frequency of resonant converter 84.

During steady state operation of resonant converter 84, a sinusoidal current oscillates at resonant frequency of secondary tank circuit 152. This oscillating sinusoidal current induces a leading voltage across secondary winding 122 and inductance set 88 in proportion to their inductive reactance at the oscillation frequency. The voltage appearing across inductance set 88 is in phase with the voltage across secondary winding 122. The sum of these voltages appears across load 110.

If ion balance circuit 108 is implemented as a capacitor having a fixed capacitance, the value of capacitor 108 is usually selected to be several times larger than the capacitance of emitter 96, emitter module 98, or both. Consequently, capacitor 108 has little effect on the operating frequency of resonant converter 84 or on the AC voltage appearing across load 110. Capacitor 108 may be omitted if resonant converter is used in applications that do not include an ion emitter, such as emitter 96.

Including inductance set 88 as part of secondary tank circuit 152 lowers the resonant frequency of secondary tank circuit 152 by adding inductance. Including inductance set 88 also increases the output voltage, named output waveform 156, appearing across load 110 by the ratio of total apparent inductance of the secondary tank circuit 152 to the apparent inductance of secondary winding 122. Apparent inductance is defined as the frequency-dependent inductance measure that adjusts for the effect that capacitor 126 has on the reactance of secondary winding 122 at the operating frequency of resonant converter 84. The inclusion of inductance set 88 enables large improvements to the size, cost, reliability, and efficiency of resonant converter 84 when compared to conventional resonant converter designs, such as the circuit design disclosed for resonant converter 8 in FIG. 1.

The example in FIG. 3 discloses that the energy stored in each inductor in the secondary tank circuit is proportional to its inductance. By allowing the inductance of secondary winding 122 to be reduced, inductance set 88 reduces the amount of energy stored in the magnetic circuit of transformer 86 and enables transformer 86 to be wound using a smaller core, a core a smaller magnetic gap, and windings containing a smaller number of turns than would otherwise be required without the use of inductance set 88.

Reducing transformer size, in turn, reduces the effective stray capacitance appearing across secondary winding 122. Stray capacitance typically arises as a result of inter-winding capacitance, intra-winding capacitance, and winding to core capacitance. This stray capacitance tends to drop linearly as the linear dimensions of the transformer shrink. The process of reducing both the inductance of secondary winding 122 and the effective stray capacitance across secondary winding 122 has the effect of raising the self-resonant frequency of transformer 86, allowing the transformer to operate efficiently at higher frequencies than would otherwise be possible.

Feedback winding 132 and primary winding 120 are both near ground potential. Transformer 86 may be implemented by using a bobbin-wound design that includes a sectioned bobbin, while core 124 may be implemented using a gapped ferrite or powdered iron core. Using a sectioned bobbin and a gapped ferrite or powdered iron core is not intended to be limiting in any way since other core and winding types may be selected depending on the application.

To minimize cost and to simplify the sourcing of materials, inductance set 88 may be constructed using the same bobbin and core design used for transformer 86, though the magnetic gap selected for transformer 86 may differ from that selected for each inductance element in inductance set 88. For example, if an inductance element, such as inductance element 90, 92 or 94, is implemented using an inductor, the inductor may be disposed to include a single winding with no additional windings electrically loading its core. Each inductor used in inductance set 88 may be physically separated by distances sufficient to allow only minimal electric field interaction with adjacent elements. Consequently, the electrical potential of the core of each inductor is free to float to the average voltage along its winding. This minimizes voltage stress between the windings and the cores and also minimizes losses associated with the displacement currents that flow in the coil form between the winding and the magnetic core of each inductor in inductance set 88.

The inclusion of isolation circuit 102 with power supply 82 is an optional implementation of the example shown in FIG. 3A. Isolation circuit 102 essentially isolates secondary tank circuit 152 from loading by DC power supply 100 during the operation of resonant converter 84, while also permitting DC power supply 100 to provide excitation energy to resonant converter 84. Isolation circuit 102 may be implemented using an AC choke coil that has an inductance value of approximately between 50 and 1000 µH although this range is not intended to be limiting in any way. Any AC choke coil value may be used that is sufficient to isolate secondary tank circuit 152, while permitting a current, or equivalent excitation energy, to reach resonant converter 84. For example, AC choke coil may have a value that is larger than the leakage and magnetizing inductance of each leg, such as legs 134 and leg 136, of primary winding 120.

The sudden switching of current between the two legs of primary winding 120, such as legs 134 and 136, caused by commutation of switch elements 144 and 146, such as transistors 148 and 150, may generate large voltage transients unless snubbing components are available to absorb these transients. In resonant converter 12 of FIG. 2, this function is provided by transformer 36 in conjunction with load 18 and capacitor 48. In the example shown in FIG. 3, however, load 110 is isolated from transformer 86 by inductance set 88, so the full commutation transient is absorbed by capacitor 126 through transformer 86. To enhance further the attenuation of these transients, particularly those associated with leakage inductance in primary winding 134, additional snubbing circuitry comprising components, such as resistors, capacitors, transient voltage suppressors, metal oxide varistors, Zener diodes, spark gaps, or combinations of these components may be added (not shown). These components may be connected between the emitter and collector terminals of transistors 148 and 150, respectively, and also sometimes across isolation circuit 102.

During steady state operation of resonant converter 84, commutation of switch elements 144 and 146 excite currents that circulate in the resonant tank circuit, named "primary tank circuit," that includes primary winding 120 and capacitor 126. The value of capacitor 126 and the sum of the leakage and magnetizing inductance of primary winding 120 determine the frequency of the related resonant mode. In most cases, the efficiency of resonant converter 84 peaks when a value of capacitor 126 is selected to place the resonant mode of the primary tank circuit at an even harmonic of the resonance in secondary tank circuit 152, which is the operating frequency of resonant converter 84. This selection for the value of capacitor 126 minimizes switching losses by causing transistors 148 and 150 to commute when the voltage across primary winding 120 is near zero volts. In most cases, the best efficiency and most reliable behavior of resonant converter 84 is obtained when the resonant frequency of primary tank circuit is placed near the second or fourth harmonic of the resonance frequency of secondary tank circuit 152. In practice, the value of capacitor 126 is not critical and reasonably efficient operation can be obtained even when this value varies over a relatively wide range and this value typically must be adjusted experimentally to obtain maximum circuit efficiency. For example, capacitor 126 may have a value within an approximate range from 50 nF to 120 nF. These values are not intended to be limiting in any way and are provided as an example implementation of a resonant converter that can drive a load within an approximate range from 70 to 100 pF at a resonant frequency within an approximate range from 10 to 20 kHz, assuming that low voltage 105 is around 10 volts, that resonant converter 84 includes transformer 86, inductive elements 90, 92, and 93 as shown in FIG. 3, and that these are all wound on cores of similar size.

When a resonant frequency of primary tank circuit is selected to be near the second harmonic of the operating frequency of resonant converter 84, the initial design and analysis of resonant convert 84 is relatively simple. In most cases, primary winding 120 and secondary winding 122 are relatively tightly coupled so that leakage inductance in these windings can be ignored for first-order calculations. If capacitor 126 resonates with the magnetizing inductance at twice the operating frequency, its capacitive reactance at the operating frequency of resonant converter 84 will be four times the inductive reactance at the operating frequency. This has the effect of increasing the inductive reactance seen across secondary winding 122 by a factor of 4/3 at the operating frequency above that associated with the total inductance of secondary winding 122 when primary winding 120 is not connected to any circuitry.

Using the components, values and ranges for the elements disclosed herein is not intended to be limiting in any way. One of ordinary skill in the art having the benefit of the herein disclosure would readily recognize that the selection of components and their values is affected by many tradeoffs involving cost, performance, reliability, and desired form factor. It is convenient for purposes of illustration, however, to make some simplifying assumptions, none of which are generally required by the various embodiments of the present invention. In the design example presented below, cores and sectioned bobbins of the same size and type are used to implement transformer 86 and each inductor in inductance set 88, such as inductors 90, 92, and 94. The magnetic flux density in core 124 is selected to approximately match the magnetic flux levels in the cores of each inductor in inductance set 88 during steady state operation of resonant converter 84. The same wire size and the same number of windings per bobbin section are used for the windings of each inductor in inductance set 88 and for secondary winding 122.

The total inductance of a secondary tank circuit, such as secondary tank circuit 152, that will be implemented for a resonant converter, such as resonant converter 84, that uses an inductance set, such as inductance set 88, may be calculated by using the following equation.

$$L_R = \frac{1}{(2\pi F)^2 C_R}$$

where "$L_R$" is the total inductance of the secondary tank circuit, "$C_R$" is the capacitance of the load that will be driven by the resonant converter, and "F" is the desired operating frequency of the resonant converter. The desired frequency F may be defined by the conditions necessary to optimize bipolar ion generation by static neutralizer 80, the capacitance of load 110, as well as the operating environmental conditions to which static neutralizer 80 is exposed. For example, frequency F may be within an approximate range from 2 to 100 kHz although in the examples shown herein frequency F is within an approximate range from 10 to 20 kHz.

Since in this example, resonant converter 84 is designed for use with a static neutralizer, such as static neutralizer 80, $C_R$ represents the capacitance of the emitter, emitter module or both used by the static neutralizer, such as emitter 96, emitter module 98 or both respectively, while the desired operating frequency F reflects the frequency of the output waveform that will be used to create ions by corona discharge when the waveform is applied to emitter 96.

The inductance of each inductor in inductance set 88 may then be calculated by selecting an inductance equal to the fraction of total inductance $L_R$ corresponding to the fraction of the total number of secondary windings wound on each inductor of the inductance set. For instance, if inductors 90, 92 and 94 are configured to have six winding sections, and if transformer 86 includes four secondary winding sections and two sections devoted to primary winding 120 and feedback winding 132, then secondary tank circuit 152 will include a total of 22 winding sections and the core of each inductor in inductance set 88 may be gapped to have an inductance $L_i$ set by the following equation.

$$L_i = L_R * 6/22.$$

The core of the transformer that will be used for secondary winding 122, such as core 124 and transformer 86, respectively, may be gapped so that the secondary winding 122 has a winding inductance that is calculated using the following equation:

$$L_{2w} = L_R * (4/22) * (3/4) = L_R * 3/22$$

where $L_{2w}$ is the inductance of the secondary winding and the factor 3/4 compensates for the effect that capacitor 126 has on the effective secondary inductance of transformer 86 when resonant converter 84 is operating at its operating frequency F.

If the resonant frequency of the primary tank circuit is selected to be something other than the second harmonic of the operating frequency of the resonant circuit, minor adjustments to the above calculation may be required. For instance, if the resonant frequency of the primary the circuit is selected to be the fourth harmonic of the operating frequency, capacitor 126 causes the apparent inductance of secondary winding 122 to increase by the ratio 16/15 instead of the ratio 4/3. For this case, and with reference to the example above, the core 124 would be gapped so that secondary winding 122 has an inductance $L_{2w}$ that is calculated by using the following equation:

$$L_{2w} = L_R * (4/22) * (15/16) = L_R * 15/88$$

where $L_{2w}$ is the inductance of the secondary winding and the factor 15/16 compensates for the effect that capacitor 126 has on the effective secondary inductance of transformer 86 when resonant converter 84 is operating at its operating frequency.

The wire size, number of turns per section, core size, core material, coil form material, and wire insulation material may be selected based on tradeoffs between core loss, copper loss, magnetic leakage, dielectric losses, desired operating temperature, and other considerations that are known to one of ordinary skill in the art having the benefit of the herein disclosure.

The approach above may further include computing the number of turns required for primary winding 120 by using the following relationships. During steady state operation of resonant converter 84, the output waveform amplitude across load 110 is determined principally by the value of low voltage 105, by the ratio of the number of turns used by primary winding 120 and secondary winding 122, named "transformer turns ratio", and by the ratio between the apparent inductance of secondary winding 122 and the inductance of inductance set 88. Because of magnetic coupling through core 124, approximately identical waveform shapes appear across secondary winding 122, primary winding 120 and feedback winding 132. The voltage present on center tap 106 is full wave rectified by the commuting action of switch elements 144 and 146, such as transistors 148 and 150, and has an amplitude equal to one half that of the peak voltage across primary winding 120. Because inductors pass DC voltages, the DC level on each side of isolation circuit 102 is approximately equal if it is implemented using an AC choke coil. Consequently, the average or DC voltage level at center tap 106 is approximately equal to the voltage output of DC power supply 100, such as low voltage 105

It is well known that the average or DC component of a full-wave rectified sine wave is equal to $2/\pi$ times the peak value of that sine wave. The peak value of the sine wave voltage across primary winding 120 is therefore approximately equal to $\pi$ times the voltage 105 supplied by DC power supply 100. The peak voltage of the sine wave at the operating frequency across secondary winding 122 is equal to approximately this value multiplied by the transformer turns ratio between primary winding 134 and secondary winding 132. The output waveform across load 110 is approximately equal to the peak voltage across secondary winding 122 multiplied by the ratio of the total inductance of secondary tank circuit 152 divided by the apparent inductance of secondary winding 122 at the operating frequency of resonant converter 84.

Although the above approach teaches relationships that would be found useful for enabling the various embodiments of the present invention, such as the embodiment disclosed in FIG. 3, it is not intended to limit these embodiments and the present invention taught by these embodiments. One of ordinary skill in the art after having the benefit of the herein disclosure would readily recognize that other relationships may be used to practice the present invention without undue experimentation.

Figure 4:
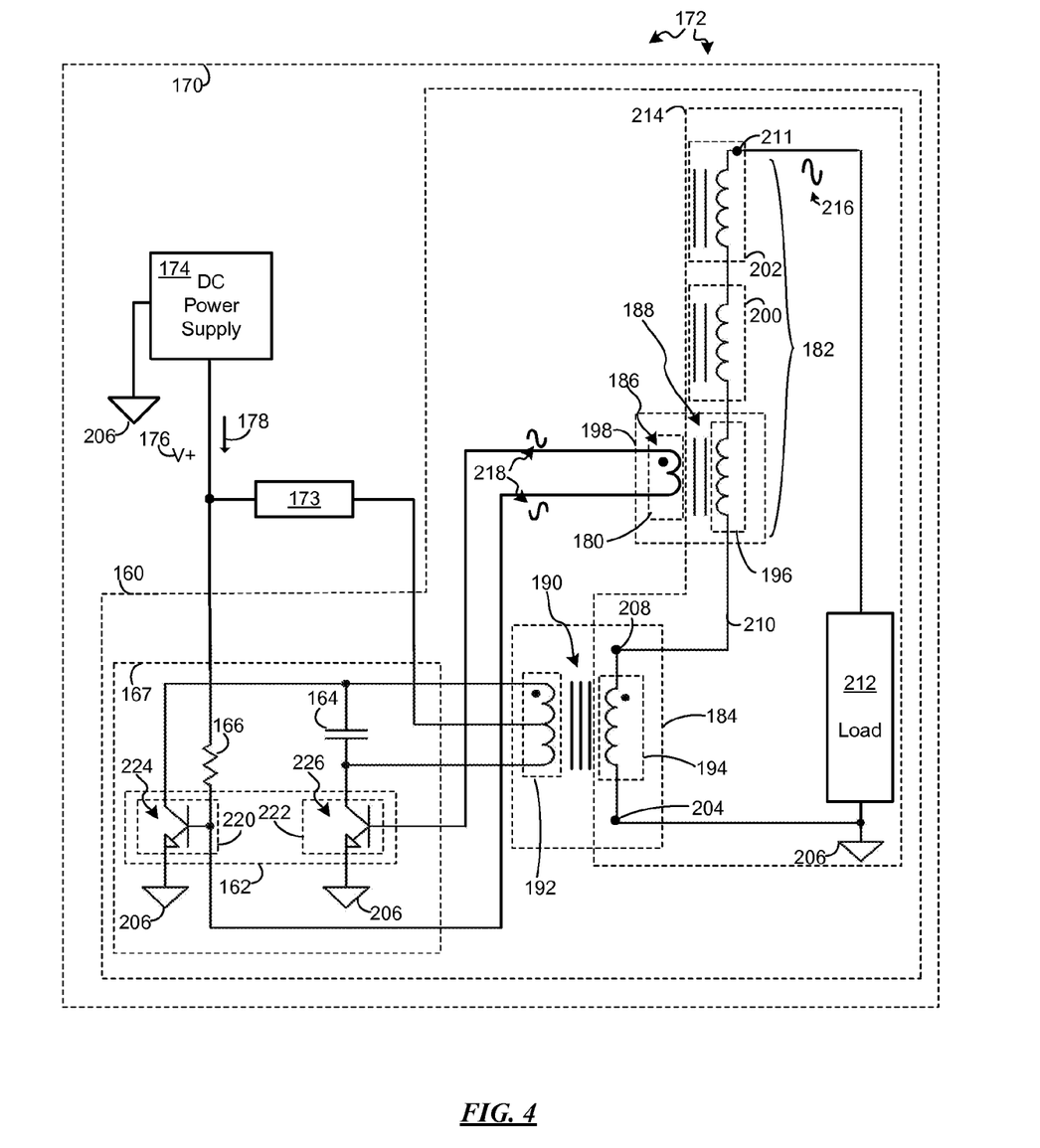
FIG. 4 illustrates a resonant converter that attenuates or reduces spurious oscillations in accordance with yet another embodiment of the present invention.

Turning now to FIG. 4, a resonant converter 160 that attenuates or reduces spurious oscillations is disclosed in accordance with yet another embodiment of the present invention. Resonant converter 160 may have a circuit structure similar to that of resonant converter 84 in FIG. 3A, and includes a switching circuit 162, a capacitor 164, a bias resistor 166, a commutation circuit 167 and a load 212 that may have substantially the same structure and function as switching circuit 130, capacitor 126, bias resistor 128, commutation circuit 116 and load 110, respectively, disclosed in FIG. 3A. In addition, resonant converter 160 may be used as part of a power supply 170 for a static neutralizer 172. Power supply 170 may include an isolation circuit 173 and a DC power supply 174 that provides excitation energy, such as low voltage 176 and current 178, to resonant converter 160. Power supply 170, static neutralizer 172 and isolation circuit 173 may have substantially the same structure and function as high voltage power supply 82, static neutralizer 80 and isolation circuit 102 in FIG. 3A.

Resonant converter 160 also includes a sensing circuit 180, an inductance set 182 and a transformer 184. Unlike the circuit structure disclosed for resonant converter 84 in FIG. 3, sensing circuit 180 may be implemented by using a feedback winding 186 that is wound on a core 188 that is separate from a core 190 that is used by a primary winding 192 of transformer 184. Besides core 190 and primary winding 192, transformer 184 also includes a secondary winding 194. Inductance set 182 includes at least one inductive element formed by main winding 196 on core 188 of feedback transformer 198. As shown in FIG. 4, inductance set 182 may include main winding 196 of feedback transformer 198, and it may also include one or more additional inductive elements, such as inductive element 200, inductive element 202 or both. Including these additional inductive elements reduces the energy storage requirements of transformer 184 and feedback transformer 198, leading to cost and efficiency improvements in resonant converter 160. In one embodiment of the present invention, inductive elements 200 and 202 may each be implemented using inductors that each have inductance values within an approximate range from 170 to 1000 mH but these values are not intended to be limiting in any way and are provided as an example implementation of a resonant converter that can drive a load within an approximate range from 70 to 100 pF at a resonant frequency within an approximate range from 10 to 20 kHz, assuming that resonant converter 160 includes transformer 184, feedback transformer 198, inductive element 200, and inductive element 202 as shown in FIG. 4 and that these are all wound on cores of similar size.

An end of secondary winding 194, such as end 204, connects to ground 206, while the other end of secondary winding 194, such as end 208, connects to one end of inductance set 182, such as end 210. The other end of inductance set 182, such as end 211, ultimately connects to ground 206 through load 212. Secondary winding 194, inductance set 182 and load 212 form a secondary tank circuit 214. Like resonant converter 84 in FIG. 3A, resonant converter 160 oscillates at the resonant frequency of its secondary tank circuit, which in this example is secondary tank circuit 214.

During operation of resonant converter 160, feedback transformer 198 senses the resonant circulating current flowing through secondary tank circuit 214 and converts this current into a differential voltage that leads the circulating current by 90 degrees but is in phase with the voltage across load 212, such as the voltage amplitude of output waveform 216. Because the current flowing through secondary tank circuit 214 is approximately sinusoidal, the voltage amplitude of feedback signal 218 appearing across feedback winding 186 is also approximately sinusoidal. Feedback signal 218 is used by commutation circuit 167 to control switch elements 220 and 222, which may be implemented using bipolar NPN transistors 224 and 226, of switching circuit 162. Apart from the implementation that generates feedback signal 218, resonant converter 160 operates in a similar manner to that of resonant converter 84 in FIG. 3A, and component selection procedures that are similar to the procedures disclosed above can be used for both embodiments.

Figure 5:
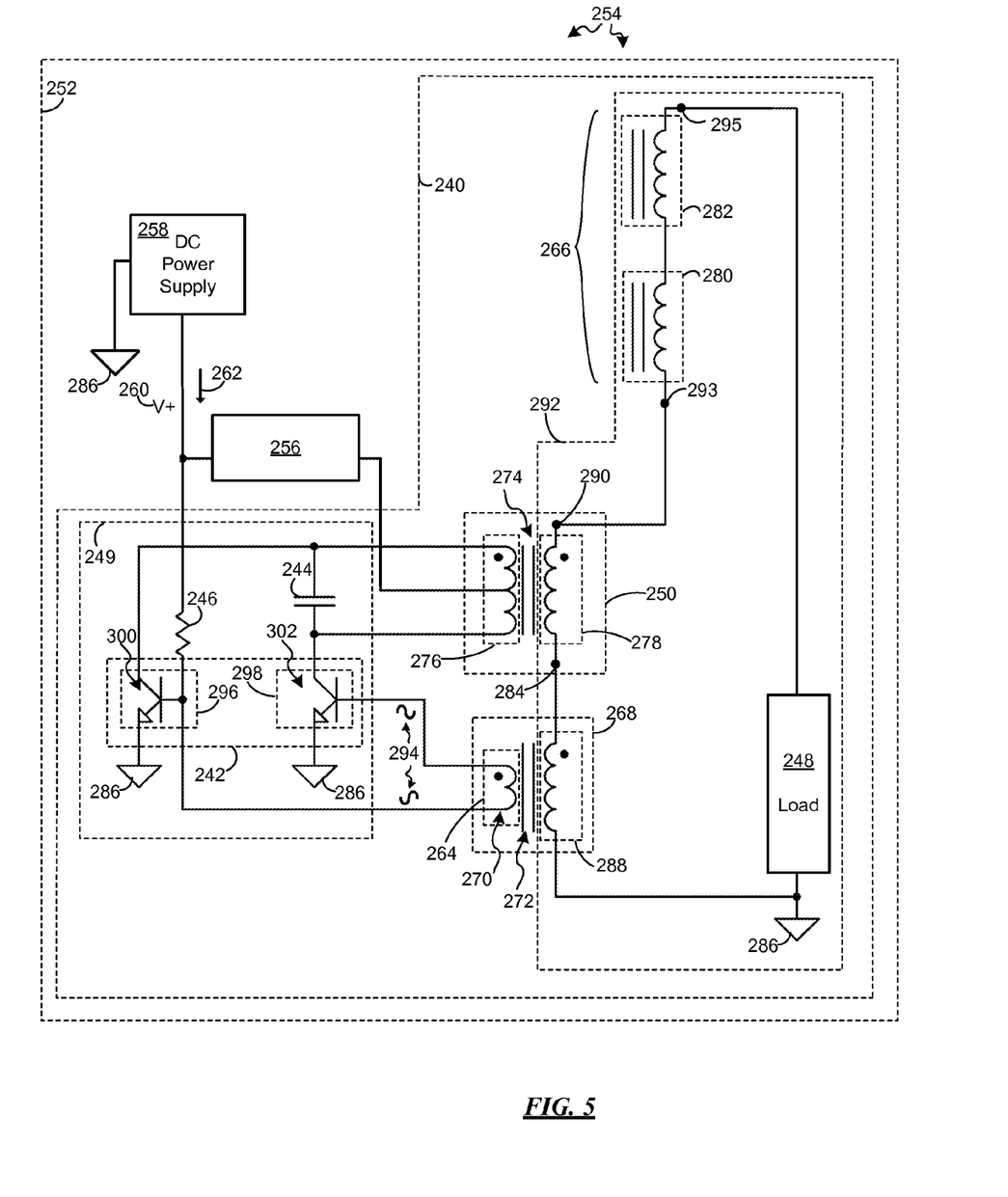
FIG. 5 illustrates a resonant converter that operates with reduced losses from parasitic capacitance in accordance with a further embodiment of the present invention.

FIG. 5 illustrates another embodiment of the present invention that includes a resonant converter 240 that attenuates or reduces spurious oscillations. Resonant converter 240 may have a circuit structure that is similar to that of resonant converter 160 in FIG. 4, and includes a switching circuit 242, a capacitor 244, a bias resistor 246, a load 248, a commutation circuit 249 and a transformer 250 that may have substantially the same structure and function as switching circuit 162, capacitor 164, bias resistor 166, load 212, commutation circuit 167 and transformer 184 disclosed in FIG. 4. In addition, resonant converter 240 may be used as part of a power supply 252 for a static neutralizer 254. Power supply 252 may include an isolation circuit 256 and a DC power supply 258 that provides excitation energy, such as low voltage 260 and current 262, to resonant converter 240. Power supply 252, static neutralizer 254 and isolation circuit 256 may have substantially the same structure and function as power supply 170, static neutralizer 172 and isolation circuit 173 disclosed in FIG. 4.

Resonant converter 240 also includes a sensing circuit 264, an inductance set 266 and a feedback transformer 268. Sensing circuit 264 may be implemented by using a feedback winding 270 that is wound on a core 272 that is separate from a core 274 that is used by a primary winding 276 of transformer 250. Besides core 274 and primary winding 276, transformer 250 also includes a secondary winding 278.

Inductance set 266 may have any number of inductive elements, including no elements and thus, inductance set 266 may be omitted from secondary tank circuit 292. However, in the example shown, inductance set 266 may be configured to include inductive element 280 and inductive element 282. Including inductive elements in inductance set 266, such as inductive elements 280 and 282, reduces the energy storage requirements of transformer 250 and feedback transformer 268, leading to size, volume, shape, cost, and efficiency improvements that would otherwise be difficult to achieve by using conventional implementations. In the embodiment shown in FIG. 5, inductive elements 280 and 282 may each have inductance values that approximately range from 170 to 1000 mH. These values are not intended to be limiting in any way and are provided as an example implementation of a resonant converter that can drive a load within an approximate range from 70 to 100 pF at a resonant frequency within an approximate range from 10 to 20 kHz, assuming that resonant converter 160 includes transformer 184, feedback transformer 198, inductive element 200, and inductive element 202 as shown in FIG. 4 and that these are all wound on cores of similar size.

Unlike in resonant converter 160, an end of secondary winding 278, such as end 284, ultimately connects to ground 286 through a main winding 288 of feedback transformer 268, while the other end of secondary winding 278, such as end 290, connects to one end of inductance set 266, such as end 293. The other end of inductance set 266, such as end 295, ultimately connects to ground 286 through load 248. If inductance set 266 contains no inductive elements, then end 295 and end 293 both represent the same circuit node. Secondary winding 278, inductance set 266, load 248 and main winding 288 form a secondary tank circuit 292. Resonant converter 240 oscillates at the resonant frequency of its secondary tank circuit, which in this example is secondary tank circuit 292.

A small core and bobbin for feedback transformer 268 may be used so that the inductance of main winding 288 is small and a relatively small voltage is produced across main winding 288 by the circulating currents in the secondary tank circuit 292 during operation of resonant converter 240. The step down ratio between feedback winding 270 and main winding 288 is selected so that the resistance of bias resistor 246 reflected across feedback transformer 268 to main winding 288 is large compared to the inductive reactance of main winding 288 at the operating frequency of resonant converter 240. Selection of a relatively small value for the inductance of main winding 288 reduces the electrical potential of core 274 and secondary winding 278, reducing dielectric losses in transformer 250 caused by the electrical potential difference of primary winding 276, secondary winding 278, and core 274.

During operation of resonant converter 240, feedback transformer 268 senses the resonant circulating current flowing through secondary tank circuit 292 and converts this current into a differential voltage, such as feedback signal 294. Because the current flowing through secondary tank circuit 292 is approximately sinusoidal, the voltage amplitude of feedback signal 294 that appears across feedback winding 270 is also approximately sinusoidal. Commutation circuit 249 receives feedback signal 294 and uses it to control switch elements 296 and 298, such as bipolar NPN transistors 300 and 302, in switching circuit 242. Apart from the implementation that generates feedback signal 294 and the configuration of inductance set 266, resonant converter 240 operates in a manner similar to resonant converter 160 in FIG. 4, and component selection procedures that are similar to the procedures disclosed above can be used for the embodiment in FIG. 5.

Figure 6:
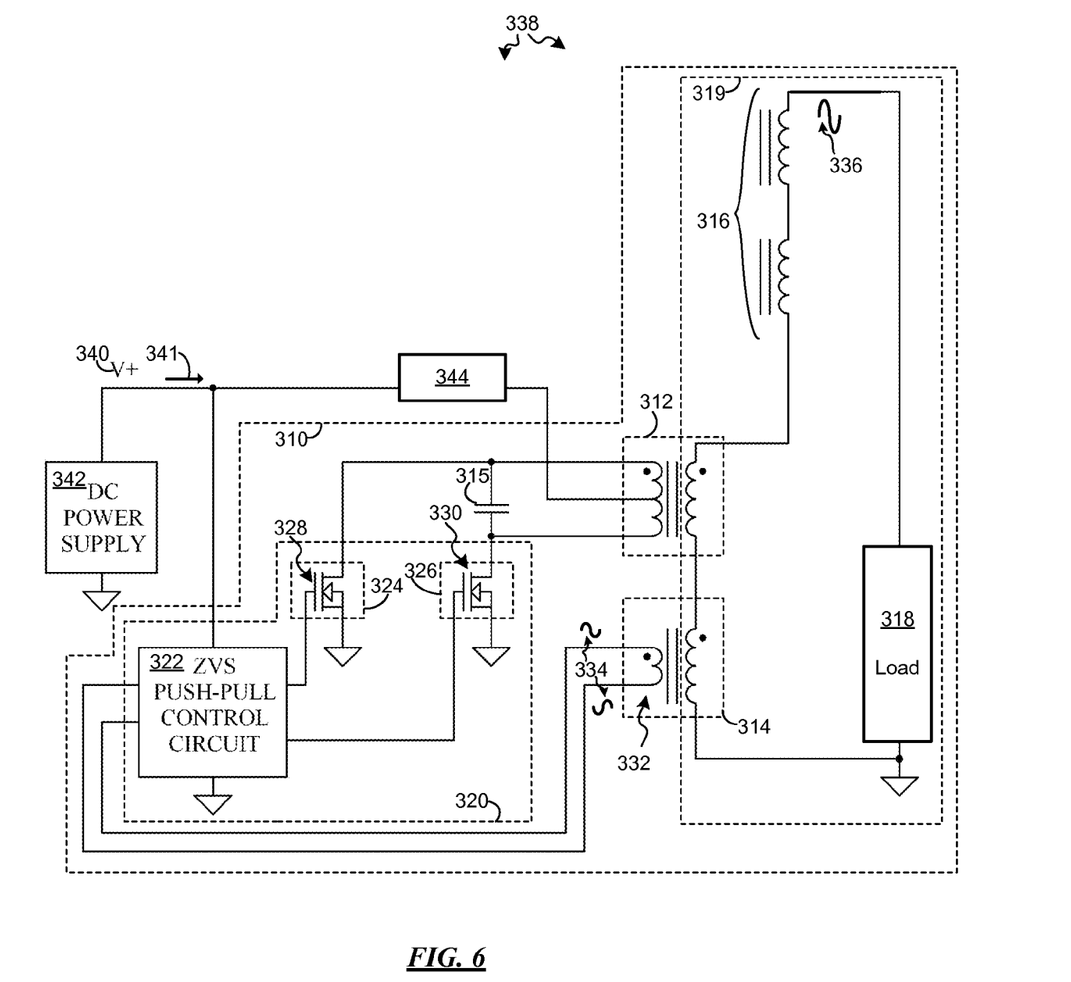
FIG. 6 illustrates a resonant converter that includes a control circuit in accordance with yet another further embodiment of the present invention.

Referring now to FIG. 6, another example of a resonant converter 310 is disclosed in accordance with another embodiment of the present invention. Resonant converter 310 may include a transformer 312, a feedback transformer 314, a capacitor 315, an inductance set 316, a load 318 and secondary tank circuit 319 that may be disposed to have substantially the same structure and function as transformer 250, feedback transformer 268, capacitor 244, inductance set 266, load 248 and secondary tank circuit 292 in FIG. 5, except switching circuit 320 includes an electronic zero-voltage switching (ZVS) control circuit 322 that is coupled to switch elements 324 and 326, such as N-channel MOSFETs 328 and 330, and to both ends of feedback winding 332 of feedback transformer 314. ZVS control circuit 322 receives a feedback signal 334, which is in differential form, from feedback winding 332. In response to feedback signal 334, ZVS control circuit 322 generates control signals that are suitable for controlling switch elements 324 and 326 so that these switch elements commutate, creating and maintaining an oscillation in secondary tank circuit 319. This oscillation flowing through secondary tank circuit 319 results in a high voltage output waveform 336, such as a waveform suitable for generating ions by corona discharge when applied to an emitter (not shown).

The ZVS control circuit 322 has a push-pull circuit configuration. ZVS control circuits, including ZVS control circuits that have a push-pull circuit configuration, are generally known, and may include an integrated ZVS controller IC along with additional power supply and support components, which are not illustrated in FIG. 6 to avoid overcomplicating the herein disclosure. In the absence of an acceptable commercially available ZVS control IC for a given application, a custom ASIC or a combination of programmable logic and other electronic circuitry can be used to obtain the desired control features described herein. In addition, although switch elements 324 and 326 can be implemented as N-channel MOSFETs, such as MOSFETs 328 and 330, one of ordinary skill in the art would readily recognize after receiving the benefit of the herein disclosure that other types of electronic switches may also be used. These might include P-channel MOSFETs, JFETs, NPN or PNP bipolar transistors, IGBTs, MCTs, thyristors, mechanical relays, solid-state relays, or the like.

Resonant converter 310 may be used with a static neutralizer 338 and disposed to receive excitation energy, such as low voltage 340 and current 341, from a DC power supply 342. An isolation circuit 344 may also be employed to isolate DC power supply 342 from resonant converter 310. Static neutralizer 338, DC power supply 342 and isolation circuit 344 may have substantially the same form and function as static neutralizer 254, DC power supply 258 and isolation circuit 256 previously disclosed above with respect to FIG. 5.

Figure 7:
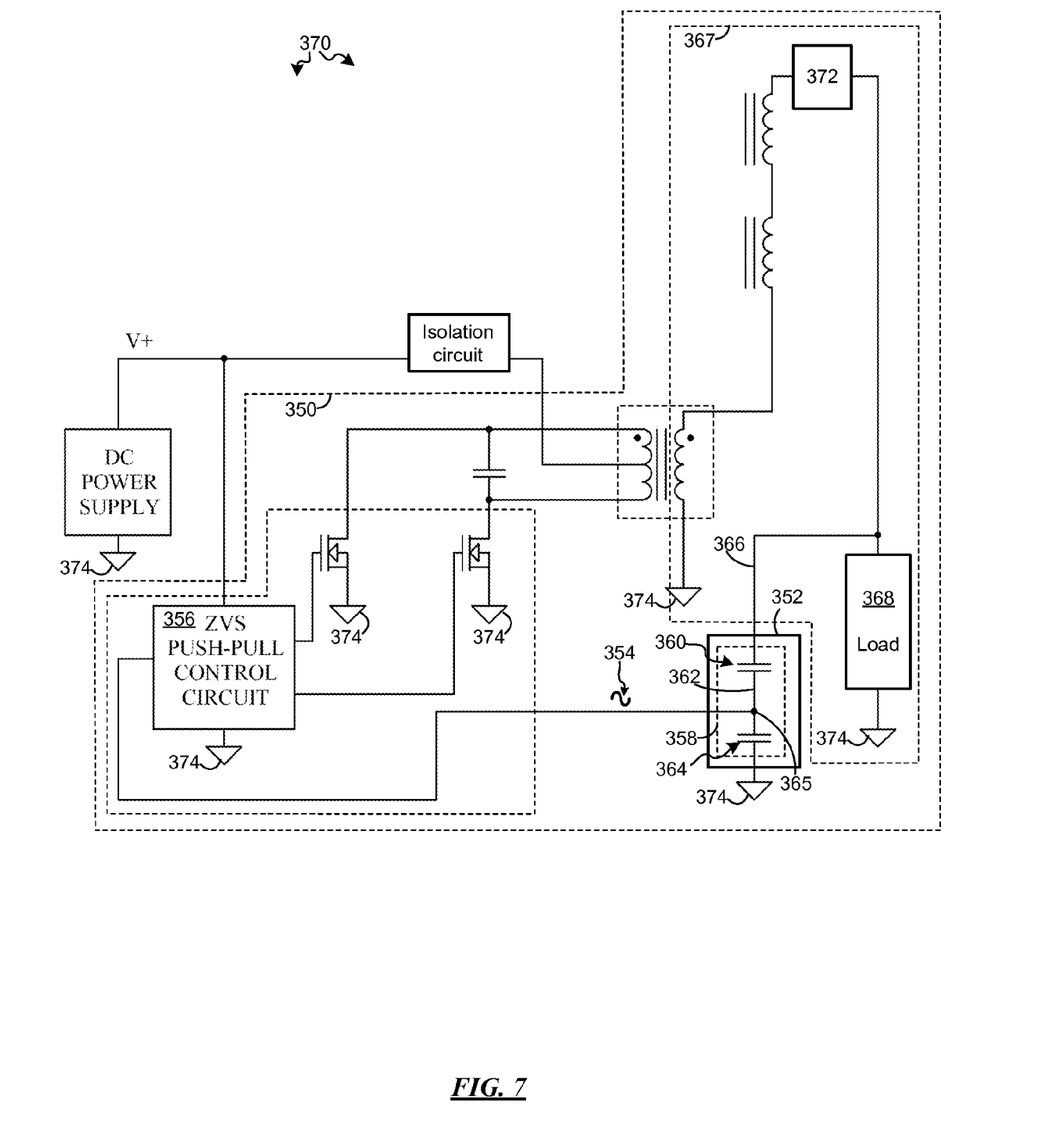
FIG. 7 illustrates a resonant converter that generates a feedback signal by sensing output voltage in accordance with a further embodiment of the present invention.

FIG. 7 includes an illustration of a resonant converter 350 in accordance with yet another embodiment of the present invention. Resonant converter 350 is substantially similar to resonant converter 310 previously disclosed above, except it includes a sensing circuit 352 that provides a single-ended feedback signal 354 and a ZVS control circuit 356 configured to accept a single-ended feedback signal, such as single-ended feedback signal 354. Sensing circuit 352 may be implemented using a circuit that provides a feedback signal in the form of a voltage, such as a capacitive divider 358. Capacitive divider 358 includes a high voltage capacitor 360 having an end 362 coupled in series with a low-voltage capacitor 364. The coupling between high voltage capacitor 360 and low voltage capacitor 364 forms an output terminal 365 that is coupled to ZVS control circuit 356, providing a signal path for single-ended feedback signal 354. The other end 366 of high voltage capacitor 360 is coupled to an element within secondary tank circuit 367 that reflects a voltage when a current oscillates in secondary tank circuit 367, such as a load 368 that will be driven by resonant converter 350. If load 368 is an emitter (not shown), such as an emitter used in a static neutralizer 370, and static neutralizer 370 includes an ion balance circuit 372, then end 366 may connect to either side of ion balancing circuit 372. The end of low-voltage capacitor 364 that is not coupled to high voltage capacitor 360 is coupled to ground 374.

In one implementation example, high voltage capacitor 360 may be implemented using copper traces on a printed circuit board (not shown). High voltage capacitor 360 may have a value that is typically much smaller than the capacitance of load 368, enabling the voltage sensing function of capacitor 360 to be carried out without adding significant loading to resonant converter 350. Low voltage capacitor 364 may be selected to have a much larger capacitance value than high voltage capacitor 360, allowing capacitor 364 divide down the output voltage to a level that is appropriate for the circuitry in ZVS control circuit 356. In the example shown, high voltage capacitor 360 and low voltage capacitor 364 may have values within an approximate range from 0.1 to 2.0 pF and 0.2 to 4.0 nF, respectively. Ion balance circuit 372 may have substantially the same structure and function as ion balance circuit 26 in FIG. 2.

Figure 8:
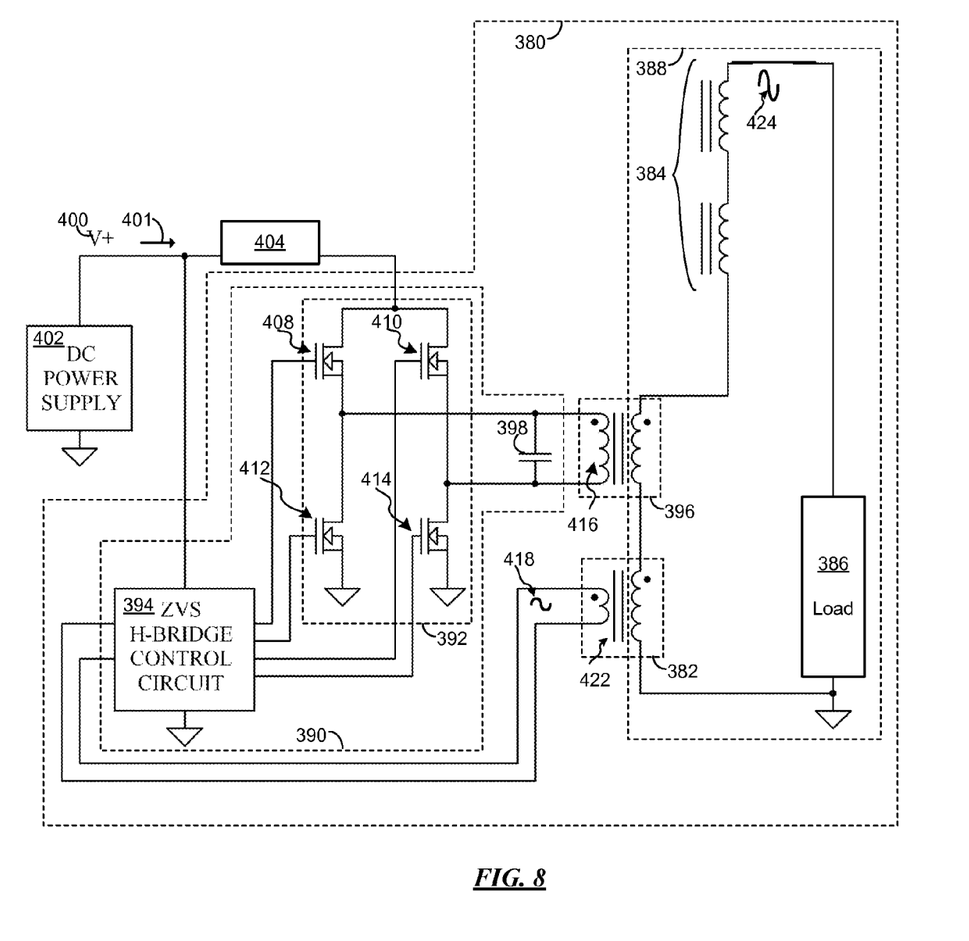
FIG. 8 illustrates a resonant converter that includes a full bridge drive circuit in accordance with yet another embodiment of the present invention.

In accordance with yet another embodiment of the present invention, a resonant converter 380 is illustrated in FIG. 8. Resonant converter 380 is similar to resonant converter 310 previously disclosed above with reference to FIG. 6. Resonant converter 380 includes a feedback transformer 382, an inductance set 384, a load 386 and a secondary tank circuit 388, which may be substantially similar in structure and function to feedback transformer 314, inductance set 316, load 318 and secondary tank circuit 319 in FIG. 6. Resonant converter 380 also includes a transformer 396 and a commutation circuit 390, which includes a switching circuit 392, a control circuit 394, and a capacitor 398. Switching circuit 392 is disposed to receive excitation energy, such as low voltage 400 and current 401, from a DC power supply 402. An isolation circuit 404 may be utilized to isolate transformer 396 from DC power supply 402 in order to prevent DC power supply 402 from acting as a load on resonant converter 380. Isolation circuit 404 may have substantially the same structure and function disclosed for isolation circuit 344 in FIG. 6.

Switching circuit 392 includes a transistor H-bridge formed from four switch elements, such as n-channel MOSFETs 408, 410, 412 and 414. The use of n-channel MOSFETs in switching circuit 392 is not intended to be limiting in any way but any type of switch element may be used that is compatible with the control circuit 394. Transformer 396 is similar to transformer 312 except primary winding 416 does not include a center-tap. In addition, primary winding 416 may be configured to include approximately half the number of turns used for the primary winding in transformer 312. Reducing the number of turns in primary winding 416 lowers its inductance may require capacitor 398 to have a capacitance that is approximately four times the value of capacitor 315 in FIG. 6.

Control circuit 394 may be implemented by using a ZVS H-Bridge control circuit, which is widely known and available. Control circuit 394 alternately activates transistors 408 and 414 or transistors 410 and 412, which reverses current through primary winding 416 each time feedback signal 418 crosses a selected threshold, such as zero volts. Feedback signal 418 is generated by feedback winding 422 and is in differential form. This reversing current in primary winding 416 excites secondary tank circuit 388, generating a high voltage output waveform 424.

While the present invention has been described in particular embodiments, it should be appreciated that the present invention should not be construed as limited by such embodiments. Rather, the present invention should be construed according to the claims below.

What is claimed is:

1. A high voltage power supply for a static neutralizer, comprising:
   a load that includes an emitter module having an emitter, reference electrode and a capacitance value;
   a resonant converter having a resonant frequency and an output electrically coupled to said load, said resonant converter for generating an output waveform at said output that has an amplitude sufficient for generating ions by corona discharge when said load receives said output waveform; and
   wherein said load is predominantly capacitive when said resonant converter is operating at said resonant frequency.

2. The high voltage power supply of claim 1, wherein said load further includes an ion balance circuit that is coupled between said emitter and said output.

3. The high voltage power supply of claim 1, wherein said resonant converter further includes:
   a transformer that includes a primary winding and a secondary winding;
   a commutation circuit having a switching circuit;
   a sensing circuit for generating a feedback signal; and
   wherein said commutation circuit delivers energy from a DC power supply through an isolation circuit to said primary winding and uses said feedback signal to maintain an oscillation within said resonant converter.

4. The resonant converter of claim 3, wherein said secondary winding and said load have a total inductance equal to:

$$L_R = \frac{1}{(2\pi F)^2 C_R}$$

wherein $L_R$ is the total inductance of said secondary winding and said load, $C_R$ is the capacitance of said load, and F is a desired operating frequency of the resonant converter.

5. The high voltage power supply of claim 3, wherein said isolation circuit includes an AC choke coil.

6. The high voltage power supply of claim 5, wherein said load further includes an ion balance circuit, said ion balance circuit including a capacitor with a capacitance value; and wherein said capacitance value of said capacitor is at least four times greater than said capacitance value of said emitter module.

7. A resonant converter for use with a power supply of a static neutralizer, said static neutralizer including a waveform output and an emitter module having at least one emitter and a reference electrode; said power supply including a DC power supply having an output, said resonant converter comprising:
 a transformer that includes a primary winding, a secondary winding, and a core;
 a commutation circuit coupled to said transformer and for receiving a current from said output of said DC power supply;
 a load having a first end coupled to the waveform output and including the emitter module;
 a sensing circuit that generates a feedback signal, said feedback signal provided to said commutation circuit; and
 wherein said load is predominantly capacitive during operation of said resonant converter.

8. The resonant converter of claim 7, wherein excitation energy is coupled from said output through an isolation circuit to said transformer.

9. The resonant converter of claim 8, wherein said isolation circuit is coupled between the output and a first leg of said primary winding.

10. The resonant converter of claim 7:
 wherein said secondary winding includes a first secondary winding end; and
 further including an inductance set coupled between said first secondary winding end and the waveform output.

11. The resonant converter of claim 7, wherein said secondary winding includes a first secondary winding end and a second secondary winding end that are respectively coupled to the waveform output and a second end of said load.

12. The resonant converter of claim 7, further including an inductance set that includes at least one inductive element connected in series with said secondary winding.

13. The resonant converter of claim 12, wherein one of said at least one inductive element includes a main winding on a second transformer.

14. The resonant converter of claim 12, wherein said sensing circuit includes a feedback winding on a second transformer.

15. The resonant converter of claim 12, wherein said secondary winding is coupled to one end of said inductor set.

16. The resonant converter of claim 12, wherein said secondary winding, said inductance set and said load are part of a secondary tank circuit that has a total inductance equal to:

$$L_R = \frac{1}{(2\pi F)^2 C_R}$$

wherein $L_R$ is the total inductance of said secondary tank circuit, $C_R$ is the capacitance of said load, and F is a desired operating frequency of the resonant converter.

17. The resonant converter of claim 12, wherein said commutation circuit allows excitation energy to be transmitted from said DC power supply to said transformer through said primary winding.

18. The resonant converter of 17, wherein said commutation circuit further includes a control circuit that controls said switching circuit in response to said feedback signal.

19. The resonant converter of claim 17, wherein:
 said primary winding further includes a second leg and an end from said first leg and said second leg provides a center tap; and
 said switching circuit includes two switch elements for switching current between said first and said second legs, and a biasing element coupled between one of said switch elements and the output.

20. The resonant converter of claim 19, wherein said switching circuit further includes a capacitor for absorbing transients from said primary winding during operation of said commutating circuit.

21. The resonant converter of claim 19, wherein said biasing element includes a resistor.

22. The resonant converter of claim 7, wherein said sensing circuit includes a feedback winding on said transformer.

23. The resonant converter of claim 7,
 further including an inductance set that includes a first inductive element and a second inductive element; and
 wherein said secondary winding is coupled in series between said first and second inductive elements.

24. The resonant converter of claim 23,
 further including a second transformer; and
 wherein said sensing circuit includes a feedback winding on said second transformer, and wherein said first inductive element includes a main winding on said second transformer, said main winding having an end coupled to said secondary winding.

25. The resonant converter of claim 23, wherein said sensing circuit includes a feedback winding on a second transformer, and said first inductive element includes a main winding on said second transformer.

26. The resonant converter of claim 7, wherein said load includes an ion balance circuit.

27. The resonant converter of claim 26, wherein said commutation circuit includes a switching circuit that includes at least one switch element.

28. The resonant converter of claim 27, wherein said switch element is a bipolar transistor.

29. The resonant converter of claim 27, wherein said at least one switch element is an element obtained from a group consisting of a MOSFET, JFET, IGBT, MCT, thyristor, opto-isolator, electro-mechanical relay and solid-state relay.

30. The resonant converter of claim 27, wherein said control circuit includes a ZVS push-pull control circuit.

31. The resonant converter of claim 27, wherein said control circuit includes a ZVS H-Bridge control circuit.

32. The resonant converter of claim 7, wherein said primary winding includes a first leg and a second leg; and wherein aid commutation circuit includes a capacitor having one end coupled to said first leg and another end coupled to said second leg.

33. The resonant converter of claim 32, wherein said coupling of said capacitor to said first and second legs enables said capacitor to absorb transients from said primary winding during operation of said commutating circuit.

34. The resonant converter of claim 7, wherein said isolation circuit is coupled between the output and a first leg of said primary winding, and said isolation circuit includes an AC choke coil.

35. The resonant converter of claim 7, wherein said sensing circuit includes a capacitive divider.

36. The resonant converter of claim 7, wherein said primary winding includes a first leg and a second leg and said commutation circuit includes switch elements for switching current alternately between said first and said second legs.

37. The resonant converter of claim 36, wherein said commutation circuit includes a control circuit disposed to receive said feedback signal from said sensing circuit, and to generate control signals for controlling said switch elements so that said switch elements switch said current alternately betweens said first and second legs.

38. A high voltage power supply for a static neutralizer, comprising:
a load that includes an emitter module having an emitter, reference electrode and a capacitance value;
a resonant converter having a resonant frequency,
an output electrically coupled to said load,
a transformer that includes a primary winding and a secondary winding,
a commutation circuit having a switching circuit, said commutation circuit delivers energy from a DC power supply through an isolation circuit to said primary winding and uses said feedback signal to maintain an oscillation within said resonant converter,
a sensing circuit for generating a feedback signal,
said resonant converter for generating an output waveform at said output that has an amplitude sufficient for generating to ions by corona discharge when said load receives said output waveform;
wherein said load is predominantly capacitive when said resonant converter is operating at said resonant frequency; and wherein said secondary winding and said load have a total inductance equal to:

$$L_R = \frac{1}{(2\pi F)^2 C_R}$$

wherein $L_R$ is the total inductance of said secondary winding and said load, $C_R$ is the capacitance of said load, and F is a desired operating frequency of the resonant converter.

39. A resonant converter for use with a power supply of a static neutralizer, said resonant converter comprising:
the power supply including a DC power supply having an output;
the static neutralizer including a waveform output and an emitter module having at least one emitter and a reference electrode;
a transformer that includes a primary winding, a secondary winding, and a core;
a commutation circuit coupled to said transformer and for receiving a current from said output of said DC power supply;
a load having a first end coupled to the waveform output and including the emitter module;
a sensing circuit that generates a feedback signal, said feedback signal provided to said commutation circuit;
wherein said load is predominantly capacitive during operation of said resonant converter;
an inductance set that includes at least one inductive element connected in series with said secondary winding; and
wherein said secondary winding, said inductance set and said load are part of a secondary tank circuit that has a total inductance equal to:

$$L_R = \frac{1}{(2\pi F)^2 C_R}$$

wherein $L_R$ is the total inductance of said secondary tank circuit, $C_R$ is the capacitance of said load, and F is a desired operating frequency of the resonant converter.

* * * * *